No. 850,965. PATENTED APR. 23, 1907.
C. RANSON.
APPARATUS FOR PRODUCING ALKALI HYDRATES AND ZINC SULFID.
APPLICATION FILED SEPT. 6, 1905.
2 SHEETS—SHEET 1.
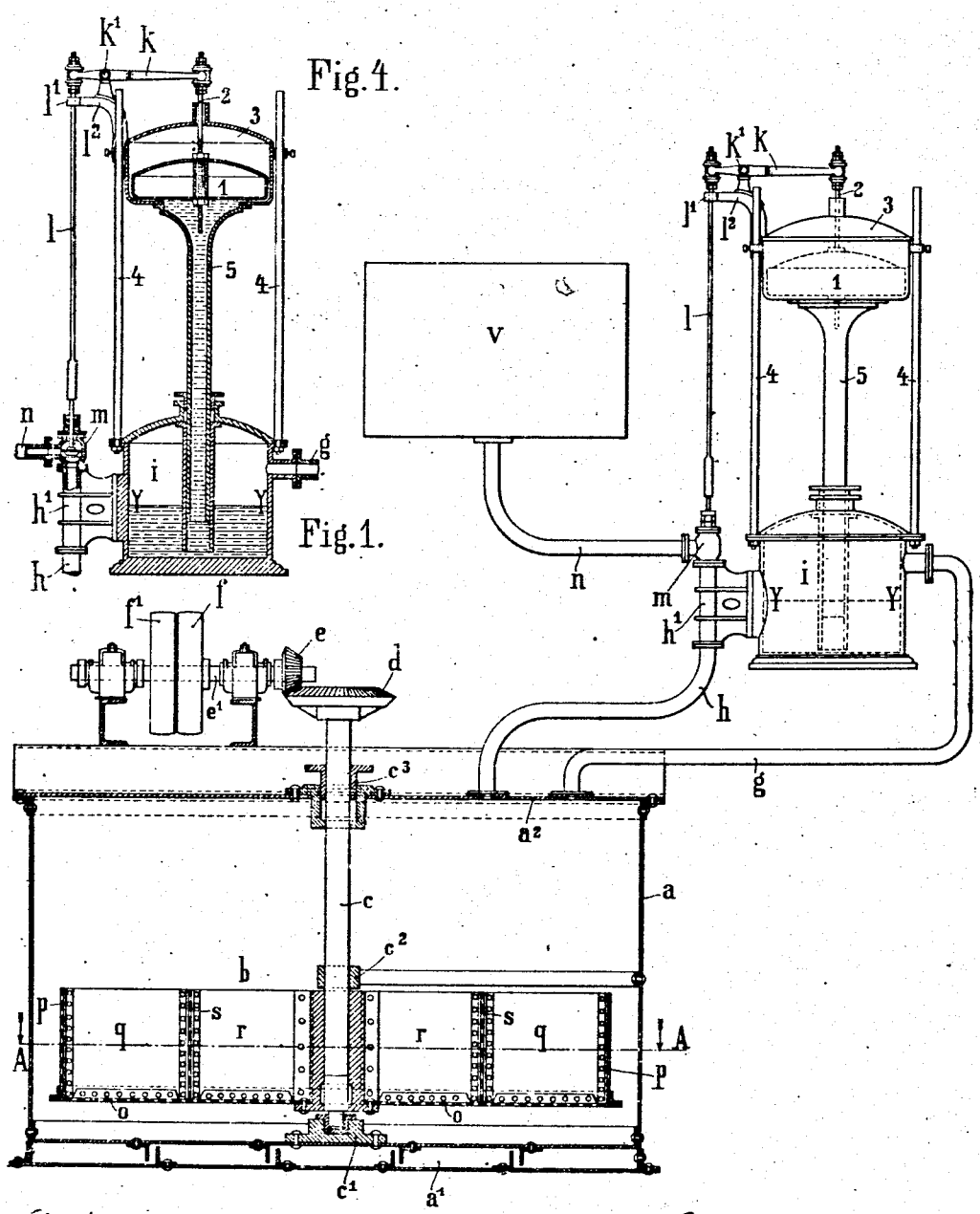

No. 850,965. PATENTED APR. 23, 1907.
C. RANSON.
APPARATUS FOR PRODUCING ALKALI HYDRATES AND ZINC SULFID.
APPLICATION FILED SEPT. 6, 1905.
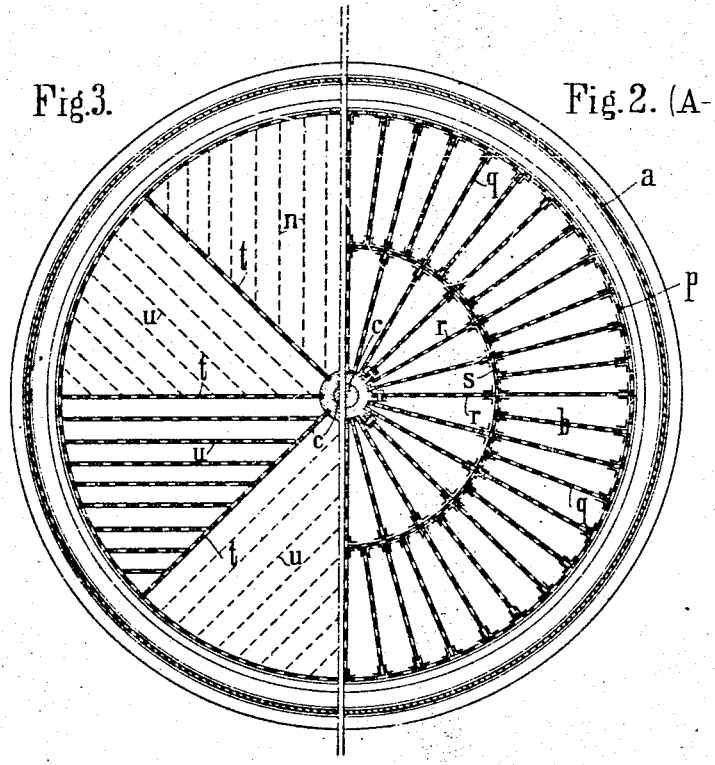
Fig.3.   Fig.2. (A--A)

UNITED STATES PATENT OFFICE.

CHARLES RANSON, OF BRUSSELS, BELGIUM, ASSIGNOR TO HENRY WILLIAM DE STUCKLE, OF DIEUZE, GERMANY.

APPARATUS FOR PRODUCING ALKALI HYDRATES AND ZINC SULFID.

No. 850,965.  Specification of Letters Patent.  Patented April 23, 1907.

Original application filed October 3, 1904, Serial No. 227,075. Patented April 17, 1906, No. 818,192. Divided and this application filed September 6, 1905. Serial No. 277,211.

*To all whom it may concern:*

Be it known that I, CHARLES RANSON, a citizen of Belgium, residing at Brussels, Belgium, have invented certain new and useful Improvements in an Apparatus for Producing Alkali Hydrates and Zinc Sulfids; and I do hereby declare the following to be a full, clear, and exact description of the invention, such as will enable others skilled in the art to which it appertains to make and use the same, this application being a division from my application, Serial No. 227,075, filed October 3, 1904.

The present invention relates to an apparatus for the manufacture of alkali or alkali hydrates, such as potassium or sodium hydrate and of zinc sulfid, as is described in my application of October 3, 1904, Serial No. 227,075, which has matured into Patent No. 818,192 of April 17, 1906.

Metallic zinc dissolves in caustic-alkali solution with evolution of hydrogen and formation of zincate of the alkali—oxid of zinc united with the alkali. From this solution alkaline sulfids precipitate sulfid of zinc, reconstituting the original alkali and forming a new portion from the alkaline sulfid employed. Therefore by covering a body of granulated zinc with a little weak alkali solution and feeding in strong solution of alkali sulfid as the zinc dissolves the zinc can be ultimately converted into precipitated zinc sulfid, useful as a pigment and for other purposes, and the alkali sulfid into caustic-alkali solution, free both from sulfur and from zinc. This is the basis of the method described in said application.

For carrying out that process in a continuous manner it is necessary that zinc in excess be treated with alkali sulfid in the presence of alkali hydrates in order that the evolution of hydrogen may not be interrupted. Furthermore, it is necessary that the addition of alkali sulfid in excess may be prevented and that the reaction takes place in a closed receptacle and that the substances reacting on each other are constantly agitated.

Agitation preserves the homogeneity of the solution, prevents accumulation of the zinc sulfid on the zinc and preserves a bright metallic surface, and insures constant metallic contact of said zinc with the iron or other metal which is used to form the structural element containing it, thereby producing a voltaic couple which much facilitates solution.

An apparatus complying with these demands forms the object of this invention.

In a closed receptacle a vessel containing the zinc rotates with a shaft. By the rotation of the vessel the necessary agitating effect is simultaneously obtained. The agitating device is at the same time so arranged that the metallic zinc may be distributed over a large surface. One way of carrying this into effect is by placing the metallic zinc in a divided or granular form into an iron receiver or drum mounted upon a rotary shaft. By revolving the receiver the necessary agitating or stirring effect is obtained.

In order that the zinc sulfid is not permanently deposited upon the zinc, but remains in suspension or is carried off after being formed for the purpose of continuously presenting new metallic surfaces to the reaction liquid, the receiver or drum is formed of a perforated or foraminated bottom and similar walls, so as to present substantially the shape of a dished strainer. Under such a construction the reaction liquid will flow toward and over the zinc from all sides and carry off the deposit.

In order to facilitate the penetration of the reaction liquid between the zinc particles, the interior of the dished foraminated iron drum is preferably divided into a number of compartments by iron perforated or foraminated partition-walls. By such a construction the liquid can pass from one compartment to the other, and, moreover, the surface of metallic iron is greatly increased. Thereby the zinc is at all parts in metallic contact with the iron, and thus its solution is facilitated according to well-known principles.

The partition-walls may be constructed and arranged in any desired manner, either radially or radially with transverse dividing-walls in the radial partitions or in any other desired or suitable manner.

In order to prevent an excess of alkali sulfid, the receptacle in which the reaction takes place is so connected with the feed-receptacle containing the alkali sulfid that the supply of said alkali sulfid is governed by the amount of hydrogen developed. For this purpose an automatic pressure-regulator is arranged in communication with the receptacle, so as to permit the access of the hydrogen thereto, and is connected with regulating means, such as a valve, in the supply-pipe connecting the alkali-sulfid receptacle with the receptacle in which the reaction takes place. The evolution of hydrogen being strictly proportional to the solution of zinc, this structure enables the feed of alkali sulfid to be proportioned to the amount of zinc oxid going into solution.

If it is desired to obtain caustic alkali and zinc sulfid simultaneously, zinc in excess is boiled with caustic alkali in the closed metallic receiver, iron filings being added for facilitating the evolution of hydrogen.

Any suitable device may be employed for heating the receptacle—such as, for example, a double bottom, as shown, for the introduction of a heating medium, such as steam, a steam-coil, or the like.

In starting the process the desired amount of zinc is first dissolved, and care is taken that undecomposed alkali hydrate is still present. Thereupon the alkali sulfid is gradually added, the stirring or agitating device being in constant motion in order to keep the finely-divided suspended zinc sulfid in suspension. Hence during the course of the process zinc, caustic alkali, and alkali sulfid are simultaneously present in the reaction-receptacle. The supply of the alkali sulfid is so regulated that the amount of the same is just sufficient to form the zinc sulfid from the zinc oxid momentarily in solution, and no excess of the same, which, as formerly stated, would be injurious, is present. After the reaction is completed only a portion of the contents of the receptacle is removed. The remainder, about one-fifth of the entire quantity, serves to insure the continuity of the reaction, and from now on it will be necessary to add only zinc and alkali sulfid for continuing the process.

The accompanying drawings represent an apparatus which I consider the preferred embodiment of this invention.

In the said drawings, Figure 1 is an elevation, partly in longitudinal vertical section, of such apparatus; Fig. 2, a sectional plan on line A A of Fig. 1, one-half of the same being represented broken away; Fig. 3, a similar view showing a modified form of drum. Fig. 4 is a longitudinal vertical section of the regulating device.

$a$ is the receptacle, in which the granulated zinc in excess and caustic alkali is heated by introducing steam or another medium into the double bottom $a'$. Heating serves to quicken the reactions.

$b$ is a rotary drum having a perforated bottom and walls. The drum is divided into compartments by perforated radial partition-walls $q$ and $r$, Fig. 2, or by radial partition-wall $t$ and transverse dividing-walls $u$, Fig. 3.

Referring to Fig. 2, the partition-walls $r$ are extended to the axis, whereas the intermediate partitions $q$ reach only to the concentric partition-wall $s$.

The drum $b$ is secured to a vertical shaft $c$, resting in the bottom bearing $c'$, intermediate bearing $c^2$, and upper bearing $c^3$. The upper end of the shaft $c$ has secured thereto a bevel-gear $d$, meshing with the bevel-gear $e$ on the shaft $e'$, to which are secured the fixed and loose pulleys $f f'$. By driving the pulley $f$ the rotation is transferred, by means of the gears $e d$, to the shaft $c$ and to the drum $b$.

The receptacle $a$ is hermetically closed by the cover $a^2$, through which the tubes $g$ and $h$ pass. The tube $h$ is supported by the bracket $h'$, connected to the bottom housing $i$ of the regulator, and may be opened or closed by the valve $m$, connected to the rod $l$. The rod $l$ is shiftably supported by the eye $l'$ of the arm $l^2$ and connected to the lever $k$, the fulcrum of which is at $k'$. The other end of the lever $k$ is connected to a float 1 by means of the rod 2 within the upper housing 3 of the regulator, which housing is supported by rods 4, resting on the bottom housing $i$. The bottom housing $i$ is connected with the upper housing 3 by means of a tube 5 and is filled with water to the level $y y$. The space above the level $y y$ is connected by the tube $q v$ 1 the upper part of the receptacle $a$.

The receptacle $v$, containing alkali sulfid, is connected to the housing of the valve $m$ by means of the tube $n$.

If hydrogen is disengaged in the receptacle $a$, it escapes through the tube $g$ into the bottom receptacle $i$ of the regulator and presses upon the water-surface, so that the water mounts through the tube 5 into the upper receptacle 3 and lifts the float 1, rod 2, lever $k$, which will turn about its fulcrum $k'$, move down the rod $l$, and press the valve $m$ on its seat, so that no alkali sulfid will be fed into the receptacle $a$. If the development of hydrogen begins to cease, the pressure acted upon the level $y y$ by the hydrogen gas becomes weaker. Then the float 1 sinks down, turns the lever $k$, lifts the rod $l$, and opens the valve $m$, so that the alkali sulfid is fed through the tubes $n$ and $h$ into the receptacle $a$.

Having now particularly described and ascertained the nature of my said invention and in what manner the same is to be performed, I declare that what I claim is—

1. An alkali apparatus comprising a closed receptacle adapted to contain alkali-forming reagents, heating means and agitating means for facilitating reaction therein, and means for feeding liquid reagent thereto controlled by the pressure of evolving gas in said receptacle.

2. An alkali-making apparatus comprising a closed receptacle, heating means and agitating means therefor, liquid-feeding means and pressure-regulated means controlling said liquid-feeding means and in gaseous communication with said receptacle.

3. An alkali-making apparatus comprising a closed receptacle, a rotatable perforated drum in the base thereof and means for feeding a liquid reagent to said receptacle controlled by the pressure prevailing therein.

4. An alkali-making apparatus comprising a closed receptacle, a rotatable perforated metallic drum in the base thereof and means for feeding a liquid reagent to said receptacle controlled by the pressure prevailing therein.

5. An alkali-making apparatus comprising a closed receptacle, a rotatable perforated drum therein divided into compartments by perforated partitions, and means for feeding a liquid reagent to said receptacle controlled by the pressure prevailing therein.

6. An alkali-making apparatus comprising a closed receptacle, a rotatable perforated iron drum therein divided into compartments by perforated iron partitions, and means for feeding a liquid reagent to said receptacle controlled by the pressure prevailing therein.

7. An alkali-making apparatus comprising a closed receptacle, rotating agitating means therein, a heating-jacket on said receptacle, and means for feeding a liquid reagent to said receptacle controlled by the pressure of evolving gas therein.

In testimony whereof I hereunto affix my signature in the presence of two witnesses.

CHARLES RANSON.

Witnesses:
  LOUIS BONY,
  MARIE PAYEN.